United States Patent
Zhu et al.

(10) Patent No.: US 10,809,464 B1
(45) Date of Patent: Oct. 20, 2020

(54) OPTICAL FIBER CONNECTING DEVICE WITH A SLEEVE RING

(71) Applicant: Amphenol Fiber Optic Technology (Shenzhen) Co., Ltd., Shenzhen (CN)

(72) Inventors: Ling-Hua Zhu, Shenzhen (CN); Xing-Fu Mo, Shenzhen (CN); Jinan Zhou, Shenzhen (CN); Anh Nguyen, Shenzhen (CN)

(73) Assignee: Amphenol Fiber Optic Technology (Shenzhen) Co. Ltd., Shenzhen, Guangdong Province (CN)

( * ) Notice: Subject to any disclaimer, the term of this patent is extended or adjusted under 35 U.S.C. 154(b) by 0 days.

(21) Appl. No.: 16/701,489

(22) Filed: Dec. 3, 2019

(30) Foreign Application Priority Data

Jul. 3, 2019 (TW) .............................. 108208629 U

(51) Int. Cl.
  *G02B 6/38* (2006.01)
(52) U.S. Cl.
  CPC ......... *G02B 6/3875* (2013.01); *G02B 6/3841* (2013.01); *G02B 6/3849* (2013.01); *G02B 6/3873* (2013.01)
(58) Field of Classification Search
  CPC .. G02B 6/3624; G02B 6/3841; G02B 6/3849; G02B 6/3873; G02B 6/3875; G02B 6/3894
  See application file for complete search history.

(56) References Cited

U.S. PATENT DOCUMENTS

| | | | | |
|---|---|---|---|---|
| 6,070,835 A | * | 6/2000 | Stillinger ................ | F16L 5/025 248/49 |
| 7,264,402 B2 | * | 9/2007 | Theuerkorn ......... | G02B 6/3851 385/59 |
| 10,185,098 B2 | * | 1/2019 | Jiang ..................... | G02B 6/3825 |
| 10,215,929 B2 | * | 2/2019 | Yan ....................... | G02B 6/3821 |
| 10,481,342 B1 | * | 11/2019 | Yang .................... | G02B 6/3866 |
| 10,551,571 B2 | * | 2/2020 | Liu ........................ | G02B 6/3825 |
| 2007/0160327 A1 | * | 7/2007 | Lewallen ............. | G02B 6/3885 385/53 |
| 2011/0188813 A1 | * | 8/2011 | Marcouiller ......... | G02B 6/3849 385/78 |
| 2019/0227244 A1 | * | 7/2019 | Huang .................. | G02B 6/3825 |

FOREIGN PATENT DOCUMENTS

| | | | | |
|---|---|---|---|---|
| CN | 210119604 U | * | 2/2020 | ............... G02B 6/38 |
| CN | 210123489 U | * | 3/2020 | ............... G02B 6/38 |
| CN | 210270276 U | * | 4/2020 | ............... G02B 6/38 |
| JP | 2013105048 A | * | 5/2013 | ............... G02B 6/38 |

* cited by examiner

*Primary Examiner* — Daniel Petkovsek
(74) *Attorney, Agent, or Firm* — Michael Best & Friedrich LLP

(57) ABSTRACT

A optical fiber connecting device includes a hollow main body, balls, a sleeve ring, and a dust-proof sleeve. An hollow insertion portion of the hollow main body has a receiving recess and ball holes. The balls are received in the ball holes. The sleeve ring is sleeved around the receiving recess and has through holes respectively aligned with the ball holes. Each balls partially protrudes from one of the through holes. The dust-proof sleeve is removably sleeved around the hollow inserting portion and has an inner groove. The balls is engaged with the inner groove to retain the dust-proof sleeve.

5 Claims, 4 Drawing Sheets

OPTICAL FIBER CONNECTING DEVICE WITH A SLEEVE RING

CROSS-REFERENCE TO RELATED APPLICATION

This application claims priority to Taiwanese Patent Application No. 108208629, filed on Jul. 3, 2019.

FIELD

The disclosure relates to an optical fiber connecting device.

BACKGROUND

For multimedia transmission, there is an optical fiber connecting assembly provided in the prior art for use in connecting an optical fiber connector, such as a LC, MPO or SC type connector, with a multimedia cable connector, such as a fan-out connector. The optical fiber connecting assembly is composed of two component parts connected to each other and configured to respectively mate different types of optical fiber connectors.

Because the optical fiber connecting assembly is a two-piece structure, when it is used to connect two different connectors respectively coupled to fiber optic cables, the two component parts of the optical fiber connecting assembly has to be assembled by an operator working for cable installation, thereby requiring additional assembling time. In some applications, the cables are needed for placement in a cable conduit, and the optical fiber connecting assembly has to be inserted into the cable conduit. To avoid dusts from contaminating termination points of the cables, a dust-proof mechanism is additionally needed for assembly with the optical fiber connecting assembly during the pulling of the optical fiber connecting assembly into the cable conduit. Since the dust-proof mechanism is not provided as an essential original part of the optical fiber connecting assembly, it should be added during cable installation, thus adversely affecting the efficiency of cable installation.

SUMMARY

Therefore, an object of the disclosure is to provide an optical fiber connecting device that can alleviate at least one of the drawbacks of the prior art.

According to the disclosure, an optical fiber connecting device includes a hollow main body, a plurality of balls, a sleeve ring and a dust-proof unit.

The hollow main body defines an axis and includes a first hollow inserting portion extending around the axis for insertion of a fiber optic connector, a second hollow inserting portion extending around the axis oppositely of the first inserting portion for insertion of another fiber optic connector, and a flange extending around the axis between the first and second hollow inserting portions. The second hollow inserting portion has an outer surface, a receiving recess formed in the outer surface and extending around the axis, an inner surface opposite to the outer surface, and a plurality of angularly spaced-apart ball holes extending through the outer surface and the inner surface and aligned with the receiving recess.

The balls are respectively received in the ball holes.

The sleeve ring is sleeved around the receiving recess and has a plurality of through holes respectively aligned with the ball holes. Each of the balls partially protrudes from one of the through holes.

The dust-proof unit includes a dust-proof sleeve that is removably sleeved around the second hollow inserting portion and that has an inner sleeve surface and an inner groove indented into the inner sleeve surface. The balls are engaged with the inner groove to retain the dust-proof sleeve.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
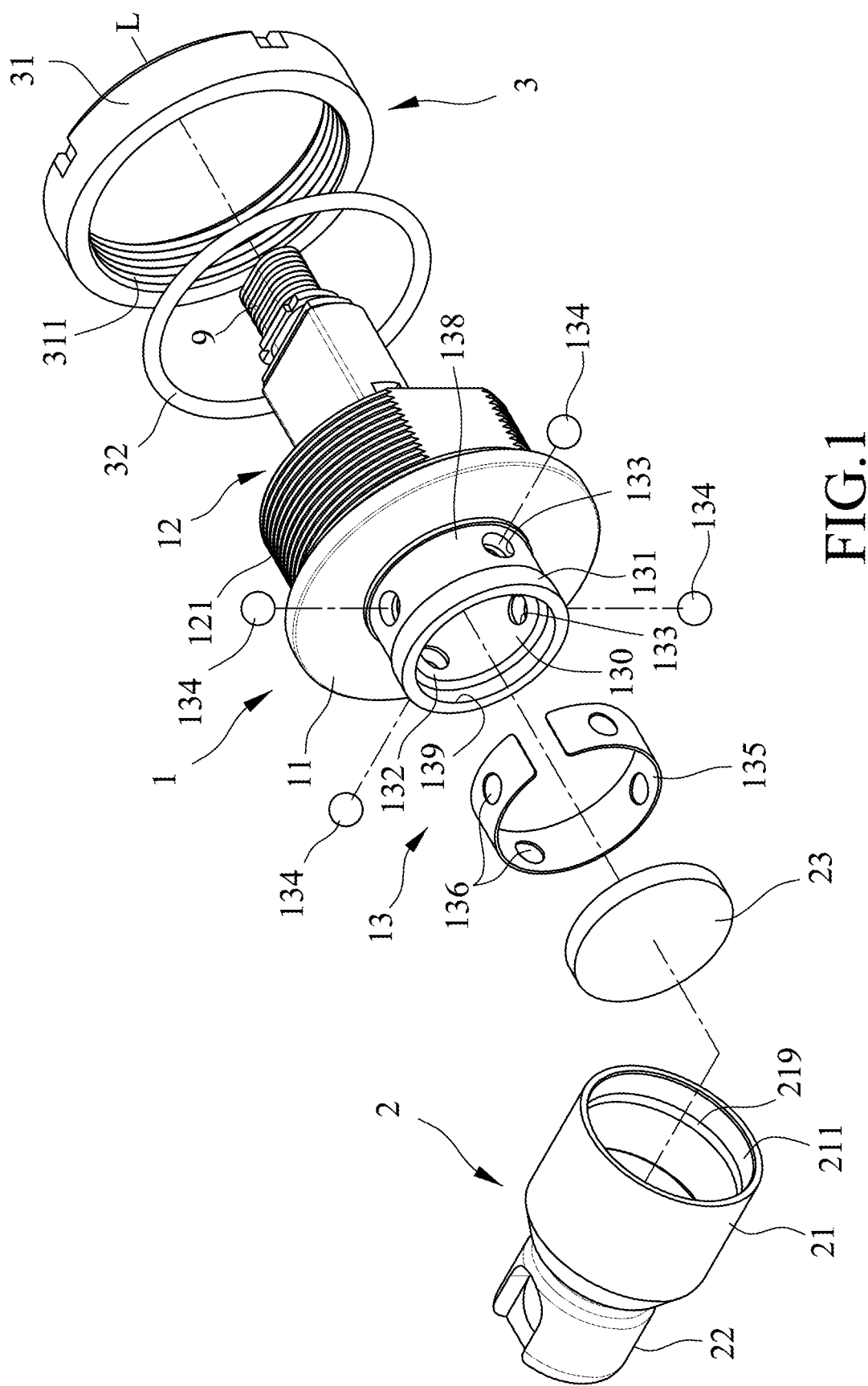
FIG. 1 is an exploded perspective view illustrating an embodiment of an optical fiber connecting device according to the disclosure.
Figure 2:
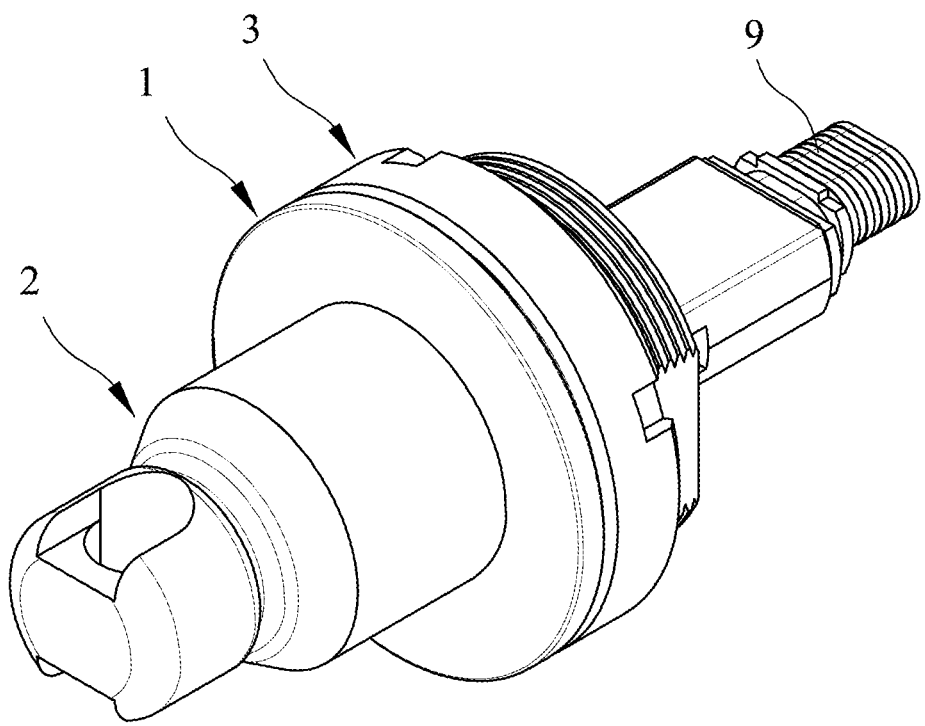
FIG. 2 is a perspective view of the embodiment.
Figure 3:
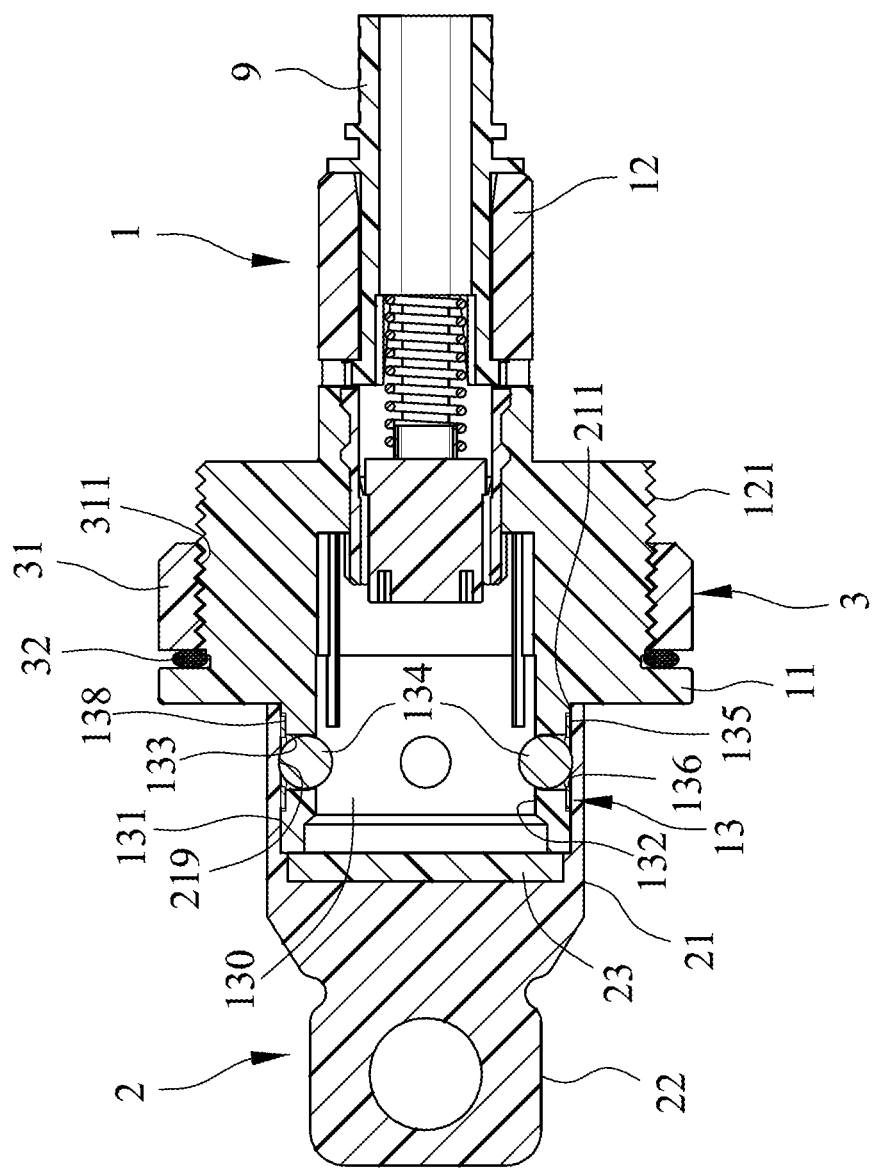
FIG. 3 is a sectional view of the embodiment.

FIGS. 1 to 3 illustrate an embodiment of an optical fiber connecting device according to the disclosure for coupling a fiber optic connector 9. The optical fiber connecting device includes a hollow main body 1, a plurality of balls 134, a sleeve ring 135, a dust-proof unit 2 and an outer sleeve unit 3. In this embodiment, the fiber optic connector 9 is an MPG connector.

The hollow main body 1 defines an axis (L) and includes a first hollow inserting portion 12 extending around the axis (L) for insertion of the fiber optic connector 9, a second hollow inserting portion 13 extending around the axis (L) oppositely of the first inserting portion 12 for insertion of another fiber optic connector, and a flange 11 extending around the axis between the first and second hollow inserting portions 12, 13. The first hollow inserting portion 12 has an outer threaded surface 121. The second hollow inserting portion 13 surrounds an inner space 130 that has an open end 139. Further, the second hollow inserting portion 13 has an outer surface 131, a receiving recess 138 formed in the outer surface 131 and extending around the axis (L), an inner surface 132 opposite to the outer surface 131, and a plurality of angularly spaced-apart ball holes 133 extending through the outer surface 131 and the inner surface 132 and aligned with the receiving recess 138.

The balls 134 are respectively received in the ball holes 133.

The sleeve ring 135 is sleeved around the receiving recess 138 and has a plurality of through holes 136 respectively aligned with the ball holes 133. Each of the balls 134 partially protrudes from one of the through holes 136.

The dust-proof unit 2 includes a dust-proof sleeve 21 and a dust cover 23 disposed in the dust-proof sleeve 21 for sealing the open end 139. The dust-proof sleeve is removably sleeved around the second hollow inserting portion 13. Further, the dust-proof sleeve 21 has an end distal from the hollow main body 1 and formed with a pull ring 22, an inner sleeve surface 211 and an inner groove 219 indented into the inner sleeve surface 211. By slightly forcing the dust-proof sleeve 21 to move over the second hollow insertion portion 13, the balls 134 received in the ball holes 133 are engaged with the inner groove 219 so that the dust-proof sleeve 21 is retained on the second hollow inserting portion 13 for prevention of dust contamination. To further prevent dusts from entering the inner space 130 of the second hollow inserting portion 13, the dust cover 23 is made from a resilient material, and abuts the open end 139 when the dust-proof sleeve 21 is sleeved around the second hollow inserting portion 13.

As shown in FIGS. 2 and 3, the outer sleeve unit 3 includes an outer sleeve 31 and seal ring 32. The outer sleeve 31 is disposed around the first hollow inserting portion 12 of the hollow main body 1, and has an inner threaded surface 311 threadedly engaged with the outer threaded surface 121 of the first hollow inserting portion 12. The seal ring 32 is sleeved around the first hollow inserting portion 12 and abuts between the flange 11 and the outer sleeve 31.

In this embodiment, the hollow main body 1 is a one-piece structure. It is unnecessary to assemble the first hollow inserting portion 12, which is configured to mate the fiber optic connector 9, with the second hollow inserting portion 13, which is configured to mate another fiber optic connector. Therefore, the optical fiber connecting device of the disclosure may save the time for assembling two component parts that are needed in the prior art.

Figure 4:
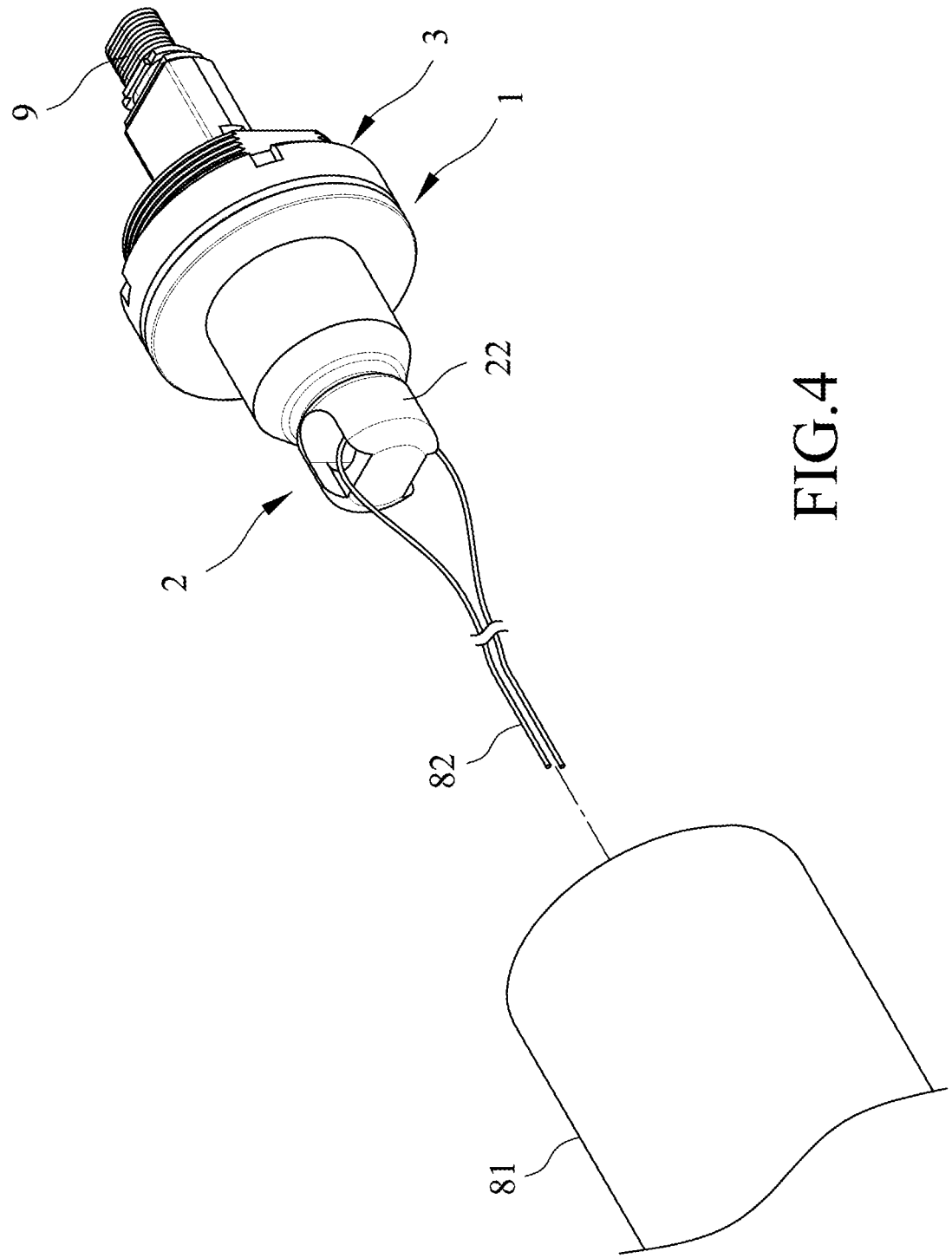
FIG. 4 is a fragmentary perspective view illustrating the optical fiber connecting device connected with a pulling string.

As shown in FIGS. 3 and 4, to insert the optical fiber connecting device into a cable conduit 81, the pull ring 22 of the dust-proof sleeve 21 sleeved on the hollow main body 1 is connected to a pulling string 82. Pulling the pulling string 82 can bring the optical fiber connecting device rapidly into the cable conduit 81. During the pulling of the optical fiber connecting device, the dust-proof unit 2 prevents dusts from entering the inner space 130 of the second hollow inserting portion 13, thereby avoiding contamination of cable contact points.

Because the hollow main body 1 is a one-piece structure in comparison with the prior art that is composed of two component parts, the optical fiber connecting device of the disclosure may save the time for assembling the two component parts of the prior art. By virtue of releasable engagement of the balls 134 and the inner groove 219 of the dust-proof sleeve 21, the dust-proof sleeve 21 can be rapidly assembled to the second hollow insertion portion 13 to prevent dust contamination and at the same time facilitate the task of pulling the optical fiber connecting device within the cable conduit.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An optical fiber connecting device comprising:

a hollow main body defining an axis and including a first hollow inserting portion extending around the axis for insertion of a fiber optic connector, a second hollow inserting portion extending around the axis oppositely of said first inserting portion for insertion of another fiber optic connector, and a flange extending around the axis between said first and second hollow inserting portions, said second hollow inserting portion having an outer surface, a receiving recess formed in said outer surface and extending around the axis, an inner surface opposite to said outer surface, and a plurality of angularly spaced-apart ball holes extending through said outer surface and said inner surface and aligned with said receiving recess;

a plurality of balls respectively received in said ball holes;

a sleeve ring sleeved around said receiving recess and having a plurality of through holes respectively aligned with said ball holes, each of said balls partially protruding from one of said through holes; and a dust-proof unit including a dust-proof sleeve that is removably sleeved around said second hollow inserting portion and that has an inner sleeve surface and an inner groove indented into said inner sleeve surface, said balls being engaged with said inner groove to retain said dust-proof sleeve.

2. The optical fiber connecting device as claimed in claim 1, wherein said dust-proof sleeve further has an end distal from said hollow main body and formed with a pull ring.

3. The optical fiber connecting device as claimed in claim 1, wherein said second hollow inserting portion surrounds an inner space that has an open end, said dust-proof unit further including a dust cover sealing said open end.

4. The optical fiber connecting device as claimed in claim 1, further comprising an outer sleeve disposed around said first hollow inserting portion of said hollow main body, and a seal ring sleeved around said first hollow inserting portion and abutting between said flange and said outer sleeve.

5. The optical fiber connecting device as claimed in claim 4, wherein said first hollow inserting portion has an outer threaded surface, said outer sleeve having an inner threaded surface threadedly engaged with said outer threaded surface of said first hollow inserting portion.

\* \* \* \* \*